(12) United States Patent
Yanagi

(10) Patent No.: US 6,377,372 B1
(45) Date of Patent: Apr. 23, 2002

(54) CIRCUIT FOR OPTICAL WDM APPARATUS

(75) Inventor: Norio Yanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/200,754

(22) Filed: Nov. 30, 1998

(30) Foreign Application Priority Data

Nov. 28, 1997 (JP) .............................................. 9-328829

(51) Int. Cl.$^7$ ................................................ H04J 14/02
(52) U.S. Cl. .......................... 359/124; 385/24; 359/127
(58) Field of Search ................................. 359/124, 127, 359/187; 385/24

(56) References Cited

U.S. PATENT DOCUMENTS 5,504,608 A * 4/1996 Neeves et al. ............... 359/124
5,636,046 A * 6/1997 Ishikawa et al. ............. 359/161

FOREIGN PATENT DOCUMENTS

| JP | 4-74038 | 3/1992 |
| JP | 8-248460 | 9/1996 |
| JP | 9-83495 | 3/1997 |
| JP | 9-289488 | 11/1997 |
| JP | 10-246832 | 9/1998 |
| JP | 11-23892 | 1/1999 |

OTHER PUBLICATIONS

Japanese Office Action dated Nov. 30, 1999, with partial translation.

* cited by examiner

Primary Examiner—Kinfe-Michael Negash
(74) Attorney, Agent, or Firm—McGinn & Gibb, PLLC

(57) ABSTRACT

A optical circuit includes a variable-wavelength optical notch filter having a notch wavelength, which receives optical WDM signals to allow an optical signal of the notch wavelength to be reflected and another optical signal to pass through. A control signal is detected from the optical WDM signals, and the notch wavelength of the variable-wavelength optical notch filter is controlled based on the control signal. The notch wavelength may be determined according to the control signal and is further controlled based on a signal level of a reflected optical signal reflected by the variable-wavelength optical notch filter such that the signal level of the reflected optical signal is maximized.

23 Claims, 3 Drawing Sheets

CIRCUIT FOR OPTICAL WDM APPARATUS

BACKGROUND OF THE INVENTION

1. Field of the Invention

The present invention generally relates to a circuit for an optical Wavelength-Division Multiplexing (WDM) system, and in particular to an optical circuit for extracting an optical signal on a predetermined wavelength from optical WDM signals.

2. Description of the Related Art

The advent of optical-fiber amplifiers causes losses due to optical fibers and optical elements to be easily compensated for, stimulating the research and development of Wavelength-Division Multiplexing which is the current favorite multiplexing technology for optical communication networks. In such an optical WDM communications network, a wavelength Add/Drop multiplexer abbreviated by ADM is needed to realize a multi-point network which can provide communications between a plurality of locations. The ADM is used to drop an optical signal on a predetermined wavelength and to add a new data stream to the same wavelength at the location thereof.

A conventional ADM has been proposed in Japanese Patent Application Unexamined Publication No. 8-248460. The conventional ADM inserted on a physical fiber link is composed of an Add/Drop optical filter.

In general, such an Add/Drop filter is composed of a fixed-wavelength filter for each wavelength. Therefore, in the case of a change in network configuration, the conventional ADM cannot easily respond to such a change with flexibility.

Further, in cases where the wavelength of a transmission optical signal changes over time, there is a possibility that the ADM becomes dysfunctional and puts communications out of operation.

SUMMARY OF THE INVENTION

An object of the present invention is to provide an optical circuit that can increase flexibility in optical signal add/drop operation.

Another object of the present invention is to provide an optical circuit that can provide add/drop control with reliability even when the network configuration is changed and/or the wavelength of an optical signal varies with time.

According to an aspect of the present invention, an optical circuit receives optical WDM (wavelength-division multiplexing) signals at an input port. The optical circuit is comprised of a variable-wavelength optical notch filter having a notch wavelength. The variable-wavelength optical notch filter receives the optical WDM signals to allow an optical signal of the notch wavelength to be reflected and another optical signal of a wavelength different from the notch wavelength to pass through. A control signal is detected from the optical WDM signals, and the notch wavelength of the variable-wavelength optical notch filter is controlled based on the control signal. The notch wavelength may be determined according to the control signal. Therefore, the variable-wavelength optical notch filter can be set to a desired notch wavelength to allow easy changes in wavelength of a dropped optical signal.

The circuit further includes a level detector for detecting a signal level of a reflected optical signal reflected by the variable-wavelength optical notch filter. The notch wavelength is controlled such that the signal level of the reflected optical signal is maximized. Therefore, the variable-wavelength optical notch filter can be optimally adjusted at all times.

According to another aspect of the present invention, an optical circuit receives optical WDM (wavelength-division multiplexing) signals at an input port. The optical circuit is comprised of a variable-wavelength optical notch filter having a notch wavelength. The variable-wavelength optical notch filter receives the optical WDM signals to allow an optical signal of the notch wavelength to be reflected and another optical signal of a wavelength different from the notch wavelength to pass through. The optical circuit further includes a level detector for detecting a signal level of a reflected optical signal reflected by the variable-wavelength optical notch filter. The notch wavelength of the variable-wavelength optical notch filter is controlled such that the signal level of the reflected optical signal is maximized. Therefore, the variable-wavelength optical notch filter can be optimally adjusted at all times.

DETAILED DESCRIPTION OF THE PREFERRED EMBODIMENTS

Figure 1:
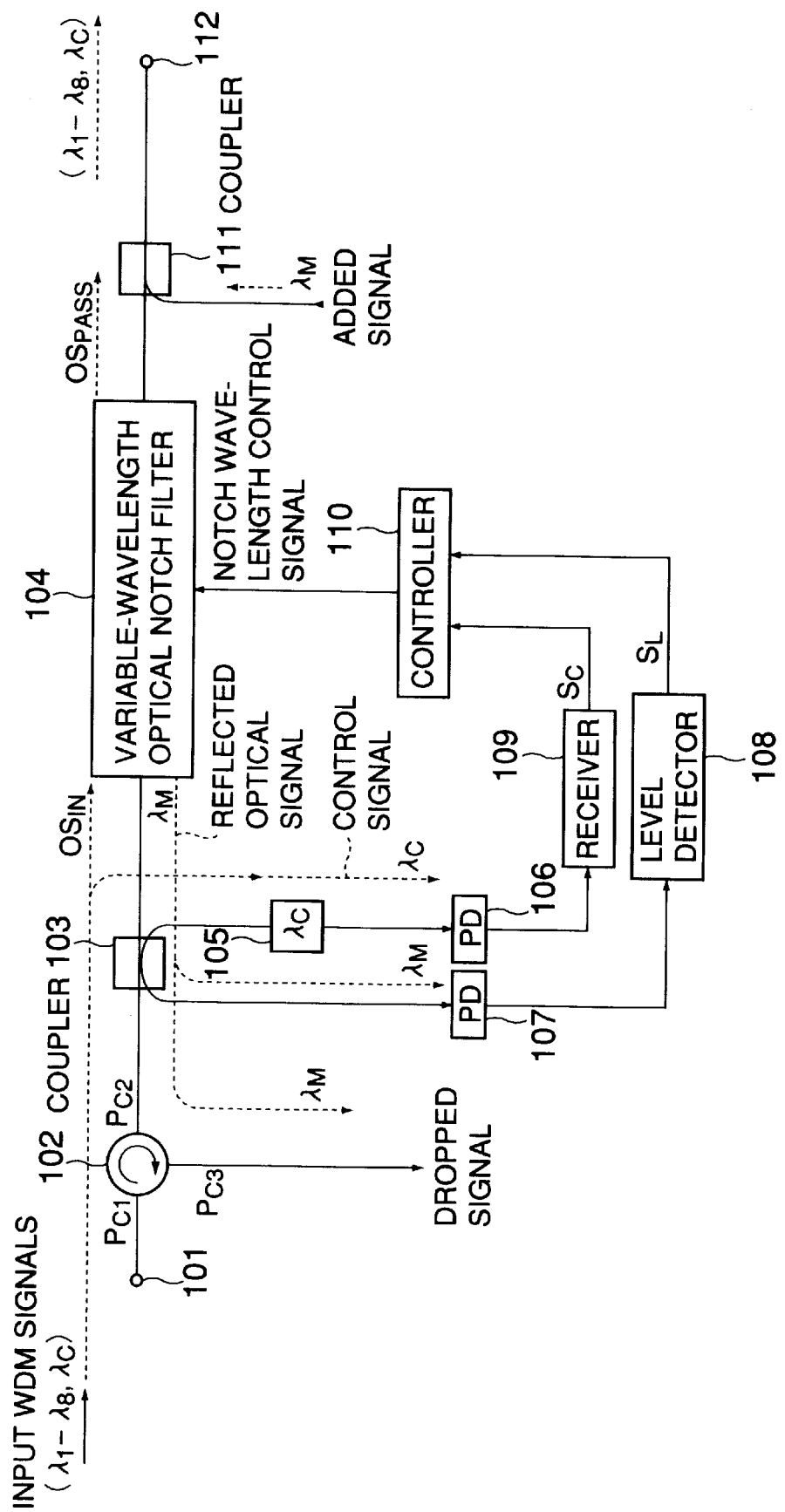
FIG. 1 is a block diagram showing a wavelength Add/Drop circuit according to a first embodiment of the present invention.

Referring to FIG. 1, there is shown a wavelength Add/Drop circuit which is inserted in a physical fiber link through which N optical WDM signals on wavelengths $\lambda_1$–$\lambda_N$ (here, N=8) and an optical control signal on a wavelength $\lambda_C$ different from any of the wavelengths $\lambda_1$–$\lambda_N$ are transmitted. The input WDM signals consisting of the optical WDM signals and the optical control signal are received at an input port 101 and then are transferred to an optical circulator 102 having three ports $P_{C1}$, $P_{C2}$ and $P_{C3}$.

The port $P_{C1}$ of the optical circulator 102 is optically connected to the input port 101 and the port $P_{C2}$ is optically connected to a coupler 103. When the optical circulator 102 receives the input WDM signals at the first port $P_{C1}$, the input WDM signals appear on the second port $P_{C2}$ thereof and are output to the coupler 103. When a reflected optical signal is received at the second port $P_{C2}$ from the coupler 103, it appears as a dropped signal on the third port $P_{C3}$ thereof.

The input optical WDM signals ($OS_{IN}$) pass through the coupler 103 and input to a variable-wavelength optical notch filter 104 and a bandpass filter 105. The variable-wavelength optical notch filter 104 allows only an optical signal on a wavelength $\lambda_M$ selected from the wavelengths $\lambda_1$–$\lambda_N$ to be reflected and the remaining optical signals ($OS_{PASS}$) to pass through. The bandpass filter 105 allows only the optical control signal on the wavelength $\lambda_C$ to pass through. The optical control signal is converted into an electronic control signal by a photodetector 106.

The optical signal on the wavelength $\lambda_M$ reflected by the variable-wavelength optical notch filter 104 is propagated in the direction opposite to the input optical WDM signals and is input to a photodetector 107 at the coupler 103 and further to the port $P_{C2}$ of the optical circulator 102. The photodetector 107 converts the reflected optical signal on the wavelength $\lambda_M$ into an electric signal. A level detector 108 receives the electric signal from the photodetector 107 and produces a signal level signal $S_L$ corresponding to the intensity of the reflected optical signal on the wavelength $\lambda_M$. A receiver 109 receives the electric control signal from the photodetector 106 and produces control data $S_C$.

A controller 110 controls the notch wavelength of the variable-wavelength optical notch filter 104 based on the control data $S_C$ received from the receiver 109 and the signal level signal $S_L$ received from the level detector 108. More specifically, the controller 110 designates the notch wavelength of the variable-wavelength optical notch filter 104 based on the control data $S_C$. Further, the controller 110 controls the notch wavelength so that the signal level signal $S_L$ is maximized. In other words, the notch wavelength is adjusted so that the intensity of the reflected optical signal on the wavelength $\lambda_M$ is maximized.

An output port of the variable-wavelength optical notch filter 104 is optically connected to a coupler 111. The output optical signals ($OS_{PASS}$) of the variable-wavelength optical notch filter 104 are combined with an added signal on the wavelength $\lambda_M$ to produce an output WDM signals which are output at an output port 112.

The variable-wavelength optical notch filter 104 has a dielectric multilayer structure where each layer thickness continuously or discretely varies from position to position to provide different transmission and reflection characteristics with respect to a position. An example of the variable-wavelength optical notch filter 104 will be described hereinafter.

Figure 2:
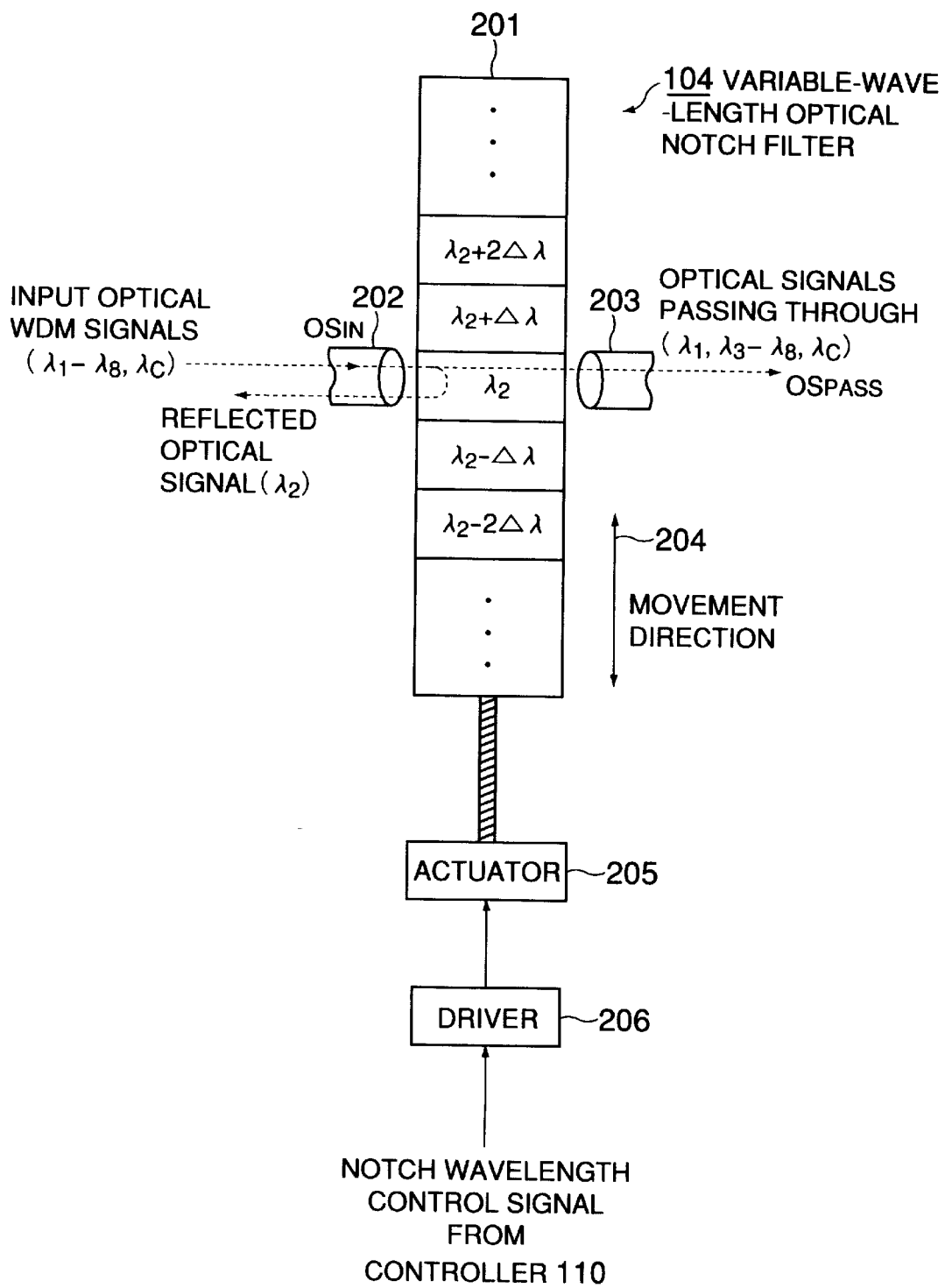
FIG. 2 is a block diagram showing an example of a variable-wavelength optical notch filter employed in the wavelength Add/Drop circuit according to the present invention.

Referring to FIG. 2, the variable-wavelength optical notch filter 104 is composed of a filter plate 201 having a plurality of dielectric multilayer notch filters formed therein. The filter plate 201 is placed between an input optical wave guide 202 and an output optical wave guide 203 and is movable in a direction 204. The input optical wave guide 202 is optically connected to the coupler 103 and the output optical wave guide 203 is optically connected to the coupler 111. The filter plate 201 is moved in the direction 204 by an actuator 205. A driver 206 drives the actuator 205 depending on the notch wavelength control signal received from the controller 110.

The respective dielectric multilayer notch filters have predetermined notch wavelengths varying in the direction 204. In this example, the dielectric multilayer notch filter at a normal position provides a notch wavelength $\lambda_2$ and one of the adjacent multilayer notch filters provides an increased wavelength $\lambda_2+\Delta\lambda$ and the other provides a decreased wavelength $\lambda_2-\Delta\lambda$. Each multilayer notch filter provides a different notch wavelength from the adjacent multilayer notch filters with a step of $\Delta\lambda$. The notch wavelength step $\Delta\lambda$ may be determined taking into account a change in transmission wavelength of an optical signal due to a lapse of time or a network system change.

As shown in FIG. 2, in the case where the input WDM signals ($\lambda_1$–$\lambda_5$, $\lambda_C$) enter the multilayer notch filter having the notch wavelength $\lambda_2$ through the input optical wave guide 202, an optical signal on the wavelength $\lambda_2$ is reflected by the $\lambda_2$ multilayer notch filter and goes back as the reflected optical signal of the wavelength $\lambda_2$ to the coupler 103 and then the optical circulator 102 as described before. The remaining input WDM signals ($\lambda_1$, $\lambda_2$–$\lambda_8$, $\lambda_C$) are allowed to pass through the $\lambda_2$ multilayer notch filter and are output through the output optical wave guide 203 to the coupler 111.

When an optical signal on the wavelength $\lambda_2$ changes in wavelength due to a lapse of time, the intensity of the reflected optical signal on the wavelength $\lambda_2$ becomes lower. Such a signal level reduction of the reflected optical signal on the wavelength $\lambda_2$ is detected by the controller 110 through the level detector 108. Then the controller 110 outputs the notch wavelength control signal to the variable-wavelength optical notch filter 104 so that the actuator 205 moves the filter plate 201 in the direction 204 to maximize the intensity of the reflected optical signal. If the wavelength of the optical signal on the wavelength $\lambda_2$ becomes shorter, the controller 110 will control the position of the filter plate 201 so that one of the multilayer notch filters having shorter notch wavelengths: ($\lambda_2-\Delta\lambda$), ($\lambda_2-2\Delta\lambda$), . . . is selected so as to maximize the intensity of the reflected optical signal.

In the case where the wavelength of an optical signal to be dropped is changed due to a change of the system configuration, similarly, the controller 110 outputs the notch wavelength control signal to the variable-wavelength optical notch filter 104 so that the multilayer notch filter having the designated notch wavelength is placed at the position of the optical wave guides 202 and 203.

In this way, the signal dropping function can be easily changed even when the network configuration is changed and/or the wavelength of an optical signal varies with time.

Figure 3:
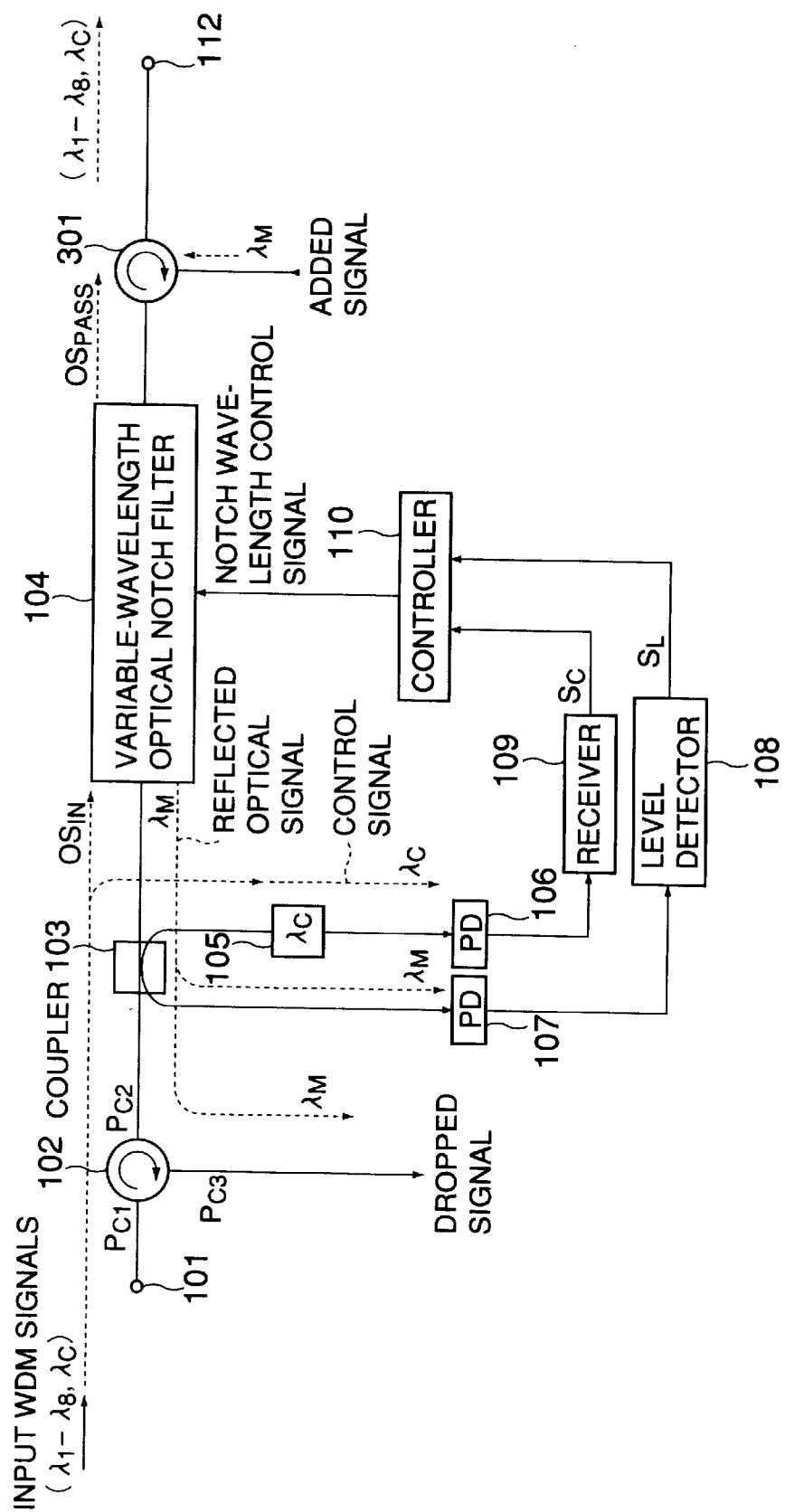
FIG. 3 is a block diagram showing a wavelength Add/Drop circuit according to a second embodiment of the present invention.

Referring to FIG. 3, an optical circulator 301 may be used in place of the coupler 111. The other circuit blocks are the same as the first embodiment as shown in FIG. 1 and their descriptions are omitted.

In this embodiment, the output signals $OS_{PASS}$ of the variable-wavelength optical notch filter 104 pass through the optical circulator 301 and the optical signal of the wavelength $\lambda_M$ is added to the output WDM signals $OS_{PASS}$ to produce the output WDM signals ($\lambda_1$–$\lambda_8$, $\lambda_C$).

What is claimed is:

1. An optical circuit comprising:
   an input port through which optical WDM (wavelength-division multiplexing) signals are received;
   a variable-wavelength optical notch filter having a notch wavelength, receiving the optical WDM signals to allow an optical signal of the notch wavelength to be reflected and another optical signal of a wavelength different from the notch wavelength to pass through;
   a detector for detecting a control signal from the optical WDM signals; and
   a controller controlling the notch wavelength of the variable-wavelength optical notch filter based on the control signal.

2. The optical circuit according to claim 1, wherein the notch wavelength is determined according to the control signal.

3. The optical circuit according to claim 1, further comprising a level detector detecting a signal level of a reflected optical signal reflected by the variable-wavelength optical notch filter, wherein the controller further controls the notch wavelength such that the signal level of the reflected optical signal is maximized.

4. The optical circuit according to claim 1, wherein the variable-wavelength optical notch filter comprises:
   a dielectric multilayer notch filter having notch wavelengths varying with respect to a position; and
   an actuator for moving the dielectric multilayer notch filter in a predetermined direction to change the notch wavelength under control of the controller.

5. The optical circuit according to claim 3, wherein the variable-wavelength optical notch filter comprises:
   a dielectric multilayer notch filter having notch wavelengths varying with respect to a position; and an actuator for moving the dielectric multilayer notch filter in a predetermined direction to change the notch wavelength under control of the controller.

6. The optical circuit according to claim 4, wherein the dielectric multilayer notch filter has a plurality of notch wavelengths formed in a filter plate such that the notch wavelengths vary from position to position with a predetermined wavelength step.

7. The optical circuit according to claim 4, wherein the notch wavelengths continuously vary from position to position.

8. An optical circuit comprising:

an input port through which optical WDM (wavelength-division multiplexing) signals are received;

a variable-wavelength optical notch filter having a notch wavelength, receiving the optical WDM signals to allow an optical signal of the notch wavelength to be reflected and another optical signal of a wavelength different from the notch wavelength to pass through;

a control signal detector for detecting a control signal from the received optical WDM signals;

a level detector for detecting a signal level of a reflected optical signal reflected by the variable-wavelength optical notch filter; and a controller controlling the notch wavelength of the variable-wavelength optical notch filter such that the signal level of the reflected optical signal is maximized.

9. The optical circuit according to claim 8, wherein the variable-wavelength optical notch filter comprises:

a dielectric multilayer notch filter having notch wavelengths varying with respect to a position; and an actuator for moving the dielectric multilayer notch filter in a predetermined direction to change the notch wavelength under control of the controller.

10. The optical circuit according to claim 9, wherein the dielectric multilayer notch filter has a plurality of notch wavelengths formed in a filter plate such that the notch wavelengths vary from position to position with a predetermined wavelength step.

11. The optical circuit according to claim 9, wherein the notch wavelengths continuously vary from position to position.

12. An optical circuit comprising:

an optical circulator for transferring optical WDM (wavelength-division multiplexing) signals received at a first port thereof to a second port thereof and transferring an optical signal at the second port to a third port thereof;

a variable-wavelength optical notch filter having a notch wavelength, for receiving the optical WDM signals from the optical circulator to allow an optical signal of the notch wavelength to be reflected and another optical signal of a wavelength different from the notch wavelength to pass through, wherein a reflected optical signal of the notch wavelength is transferred to the second port of the optical circulator;

an optical element for combining output optical signals of the variable-wavelength optical notch filter with an optical signal of the notch wavelength to produce output optical WDM signals;

a detector for detecting a control signal from the optical WDM signals; and a controller controlling the notch wavelength of the variable-wavelength optical notch filter based on the control signal.

13. The optical circuit according to claim 12, wherein the notch wavelength is determined according to the control signal.

14. The optical circuit according to claim 12, further comprising a level detector detecting a signal level of a reflected optical signal reflected by the variable-wavelength optical notch filter, wherein the controller further controls the notch wavelength such that the signal level of the reflected optical signal is maximized.

15. The optical circuit according to claim 12, wherein the variable-wavelength optical notch filter comprises:

a dielectric multilayer notch filter having notch wavelengths varying with respect to a position; and an actuator for moving the dielectric multilayer notch filter in a predetermined direction to change the notch wavelength under control of the controller.

16. The optical circuit according to claim 14, wherein the variable-wavelength optical notch filter comprises:

a dielectric multilayer notch filter having notch wavelengths varying with respect to a position; and an actuator for moving the dielectric multilayer notch filter in a predetermined direction to change the notch wavelength under control of the controller.

17. A control method for a variable-wavelength optical notch filter receiving optical WDM (wavelength-division multiplexing) signals, comprising the steps of:

reflecting an optical signal of a notch wavelength selected from the optical WEM signals and passing another optical signal of a wavelength different from the notch wavelength through at the variable-wavelength optical notch filter;

detecting a control signal from the optical WDM signals; and controlling the notch wavelength of the variable-wavelength optical notch filter based on the control signal.

18. The control method according to claim 17, wherein the notch wavelength is determined according to the control signal.

19. The control method according to claim 17, further comprising the steps of:

detecting a signal level of a reflected optical signal reflected by the variable-wavelength optical notch filter; and controlling the notch wavelength such that the signal level of the reflected optical signal is maximized.

20. A method for dropping and adding an optical signal of a predetermined wavelength, comprising the steps of:

reflecting an optical signal of a notch wavelength selected from input optical WDM (wavelength-division multiplexing) signals and passing another optical signal of a wavelength different from the notch wavelength at a variable-wavelength optical notch filter;

dropping a reflected optical signal reflected by the variable-wavelength optical notch filter;

detecting a control signal from the optical WDM signals;

controlling the notch wavelength of the variable-wavelength optical notch filter based on the control signal; and adding an optical signal of the notch wavelength to output optical signals of the variable-wavelength optical notch filter to produce output optical WDM signals.

21. The method according to claim 20, wherein the notch wavelength is determined according to the control signal.

22. The method according to claim 20, further comprising the steps of:

detecting a signal level of a reflected optical signal reflected by the variable-wavelength optical notch filter; and controlling the notch wavelength such that the signal level of the reflected optical signal is maximized.

23. The optical circuit accordingly to claim 8, wherein the control signal detected by the control signal detector is used to control the wavelength of the reflected optical signal.

* * * * *